US006382127B2

(12) United States Patent
Wehner

(10) Patent No.: US 6,382,127 B2
(45) Date of Patent: *May 7, 2002

(54) DISPLAY DEVICE

(75) Inventor: Manfred Wehner, Wölfersheim (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,503

(22) Filed: Dec. 17, 1998

(30) Foreign Application Priority Data

Dec. 23, 1997 (DE) .......................... 197 57 564

(51) Int. Cl.[7] ........................ G12B 11/00; B60K 35/00
(52) U.S. Cl. .................. 116/284; 116/62.1; 116/298
(58) Field of Search ............... 116/284, 62.1, 116/62.2, 62.3, 62.4, 285, 286, 287, 288, 289, 290, 291, 292, 293, 298, 300, 302, 57; D10/98; D12/192; 368/82, 239, 277

(56) References Cited

U.S. PATENT DOCUMENTS

| | | | | |
|---|---|---|---|---|
| 3,701,249 A | * | 10/1972 | Bergey et al. ................. 368/84 |
| 3,757,511 A | * | 9/1973 | Burgess et al. ................. 368/83 |
| 4,095,553 A | * | 6/1978 | Ono et al. ................... 116/62.3 |
| 4,247,928 A | * | 1/1981 | Dorfman ....................... 368/67 |
| 4,621,306 A | * | 11/1986 | Sell ............................. 362/29 |
| 4,629,289 A | * | 12/1986 | Streit .......................... 349/149 |
| 4,968,930 A | * | 11/1990 | Grupp et al. ................. 324/115 |
| 5,181,190 A | * | 1/1993 | Kanzaki ........................ 368/76 |
| 5,201,277 A | * | 4/1993 | Aoki et al. .................. 116/286 |
| 5,259,333 A | * | 11/1993 | Iino et al. ................... 116/286 |
| 5,295,049 A | * | 3/1994 | Terada .......................... 362/27 |
| 5,375,102 A | * | 12/1994 | Schiavolini ................... 368/10 |
| 5,690,049 A | * | 11/1997 | Marshall et al. ............. 116/284 |
| 5,949,330 A | * | 9/1999 | Hoffman et al. ............. 340/438 |

FOREIGN PATENT DOCUMENTS

| | | |
|---|---|---|
| DE | 2931327 | 2/1981 |
| DE | 3808826 | 10/1988 |
| DE | 3714072 | 11/1988 |
| DE | 3732144 | 4/1989 |
| DE | 4319441 | 12/1994 |
| DE | 4321146 | 1/1995 |
| DE | 19537666 | 4/1997 |
| DE | 29714341 | 11/1997 |

* cited by examiner

Primary Examiner—Diego Gutierrez
Assistant Examiner—R. Alexander Smith
(74) Attorney, Agent, or Firm—Martin A. Farber

(57) ABSTRACT

A display device, in particular for a vehicle, having a pointer which can be actuated by a measuring mechanism for analog representation of measured values, the display device including fixed scale marks which are assigned to the pointer, and a display, arranged in a region over at least part of which the pointer travels, for representing variable information, it being possible to represent scale labeling on the display. In order to reduce the manufacturing costs of the display device and to improve its legibility, the scale marks are arranged outside a display region which can be actuated, and at least one region of the display extends along the scale marks so that it is possible to represent the scale labeling in this region.

25 Claims, 3 Drawing Sheets

DISPLAY DEVICE

FIELD AND BACKGROUND OF THE INVENTION

The invention relates to a display device, in particular for a vehicle, the display device having a pointer which can be actuated by a measuring mechanism, and for the analog representation of measured values, fixed scale marks are assigned to the pointer. A display is arranged in a region over at least part of which the pointer travels. For representing variable information, it is possible to represent scale labeling on the display.

Such display devices are known and are used in the form of analog pointer instruments in measuring equipment, for example. In the known devices, scale labeling which is located on the scale plate can be generated and changed by electronic actuation. In such cases, the location of the scale labeling is permanently predefined in relation to the scale marks.

Other known display devices having an analog pointer instrument and a display, over which the pointer travels, for representing variable information have a large scale area which can be actuated, in which context all the display elements including the scale marks can be actuated in a variable fashion and represented on the display. However, the size of the display area which can be actuated is a direct measure of the manufacturing costs of the display, and thus of the display instrument, make these known display instruments very costly. Furthermore, the representation on the display is defined as a planar display, something which restricts the optical configuration possibilities of this display device in terms of both ergonomic and aesthetic criteria.

SUMMARY OF THE INVENTION

In order to remedy this, the object of the present invention is to design a display device in such a way that it provides an analog representation of measured values with a flexible representation of information on the scale area, accompanied by low manufacturing costs for the display device.

The object is achieved with a display device of the type mentioned above by virtue of the fact that the scale marks are arranged outside a display region which can be actuated and that at least part of the display extends along the scale marks and the scale labeling can be represented in this region. A display device according to the invention thus makes it possible, without having to dispense with an extensive representation of information, to keep the display region which can be actuated small. A display device according to the invention can therefore be manufactured in a particularly cost-effective way. In addition, in a device according to the invention the scale marks are designed independently of the display, making it possible, for example, to make it easier to perceive by a viewer and/or enabling it to be matched in terms of design to the surrounding instrumentation (for example the dashboard of an motor vehicle).

According to one advantageous development of the invention, the scale labeling can be varied, enabling both the display region of the measuring instrument and the unit which is being displayed to be varied very easily without the instrument having to be adapted mechanically. This is significant, for example, in the case of the speedometers of motor vehicles if they are to be marketed throughout the world. The displayed unit can then be converted from, for example, kilometers per hour to miles per hour by simply changing the actuation of the display and of the pointer measuring mechanism. It is particularly easy if this change is carried out by actuation software.

For a flexible representation of information in a way which is dependent only on the respective actuation, it is of particular advantage if the display is a dot-matrix display. With such display it is possible to display any number of representations which are each composed of a quantity of actuated dots of a dot-matrix.

It is advantageous that the display is particularly inexpensive and can be manufactured in large series if it has a liquid crystal cell. Liquid crystal cells provide the additional advantage that, owing to their low power consumption, they do not heat up during operation and thus do not contribute to an undesired heating of the display instrument.

According to another advantageous development of the invention, the pointer can be pivoted about an axis which is approximately perpendicular to the representational plane of the display. Such round instruments are particularly easy to read and require only a small installation area.

The display device can advantageously be of very compact design if the pointer has, in a region which is turned away from a pointer tip, a pointer hub which is connected to a pointer shaft, and if the axes of rotation of the pointer shaft and of an output shaft of the measuring mechanism are arranged so as to be congruent or approximately parallel to one another. Preferably, the pointer shaft and the measuring mechanism output shaft are connected to one another so as to form a single component. As a result, owing to a reduction in the number of individual components, the number of mounting processes during the fabrication of the display device is reduced and the inventory holding of the required individual parts is simplified.

According to another advantageous development of the invention, a gear mechanism which transmits a rotary movement of the measuring mechanism output shaft to the pointer shaft is arranged between the measuring mechanism output shaft and the pointer shaft. This makes it possible to separate the measuring mechanism from the pointer spatially and to select a flexible arrangement of the measuring mechanism such that the installation space which is available in the display device is used to an optimum degree. Preferably, the gear mechanism is a flexible drive mechanism, friction wheel mechanism or gearwheel mechanism, so that the rotary movements are transmitted in a simple and reliable way with only a few movable components. The installation space which is available at the rear of a display and/or of a dial of a display device is very limited owing to the large number of electronic and mechanical components to be accommodated so that it is of great advantage if at least part of the gear mechanism is arranged in front of the side of the representational plane of the display which faces a viewer. In order to avoid disrupting the structural impression of the display device and in order to protect the gear mechanism against dirt, the parts of the gear mechanism which are arranged in front of the representational plane are preferably covered on the viewer side with a panel.

If large areas of information, such as, for example, traffic guidance information, is represented on the display of the display device according to the invention, during which the pointer is not required, it is advantageous if the pointer can be covered on the viewer side with a panel. This makes the display panel clearly visible without superfluous, distracting elements, as a result of which the attention of a viewer is directed completely at the represented information. Preferably, the panel which covers a gear mechanism is identical to the panel with which the pointer is covered.

The legibility of measured values which are represented with the pointer is particularly good if the scale marks are arranged in the direct vicinity of, or within, a region of the display device over which the tip of the pointer travels. Here, it is particularly easy if the scale marks are located on the display. The ergonomic and design possibilities which are provided by the display device according to the invention can, however, be particularly well exploited if, according to one advantageous development of the invention, the scale marks are located on a frame element, and the frame element engages at least partially around the display. Here, the display is preferably inserted into a recess of the frame element, as a result of which the frame may simultaneously be a holder of the display.

Especially because of the possibility of easier fabrication, displays usually have a rectangular shape. In order to be able to give the frame element a shape other than a rectangular shape, for example a round or elliptical shape, it is of particular advantage if the frame element is fitted onto the display. As a result, edge regions of the display which are possibly not used do not need to be available as a display area which can be actuated—because they are covered—and can therefore be implemented easily and cost-effectively as untreated carrier surface.

It would be conceivable to illuminate the display device according to the invention by means of uplight, in particular, in order to make it legible in surrounding darkness. However, the legibility is particularly good if, according to one advantageous development of the invention, the frame element is a light guide. As a result, it is possible both to illuminate directly the scale marks which are provided on the frame element and to illuminate the display by means of light which may have been possibly extracted from the frame element in a selective fashion. The legibility and the visual impression of the display device is further improved if the scale marks are elevated or countersunk with respect to the representational plane of the display. In this way a plastic structure can be achieved.

In particular, when there is surrounding darkness, it is advantageous if the scale marks can be illuminated so that one can be sure of perceiving the represented information reliably even in darkness.

It would be conceivable to use the entire display region for representing information. However, it is frequently sufficient to use only parts of the display region. In this case, it is advantageous if part of the display is covered by a panel and a uniform structure of the display device is thus possible in this way.

It is conceivable, depending on the case, to represent only specific information on the display, for example, alternative scale labeling or warning information. However, it is of particular advantage if the display can be actuated freely in at least one part, as a result of which information can be represented flexibly on the display and even images, such as for example excerpts from maps of a traffic guidance system or video sequences, can be displayed.

The display is advantageously of simplified design if it has a region which cannot be actuated. This region which cannot be actuated is, for example, a region which is covered by a panel.

In order to safeguard an emergency operating function of the display device, for example in the case of a fault in the electronic system of a vehicle, it is advantageous if the display can be read without illumination. If a liquid crystal cell is used, said cell is therefore preferably transflective or reflective. It is of particular advantage if the display can be illuminated so that even when there is surrounding darkness the information represented on the display can be perceived.

According to another advantageous development of the invention, the display device has a dial, the scale marks being represented on the dial, and at least one region of the display which can be actuated being arranged in a recess of the dial. Such a design is suitable particularly if the display device is a component of a combination instrument, for example of a motor vehicle.

BRIEF DESCRIPTION OF THE DRAWINGS

The invention is explained in more detail below with reference to exemplary embodiments represented in the appended drawing, in which.

DETAILED DESCRIPTION OF THE PREFERRED EMBODIMENTS

Figure 1:
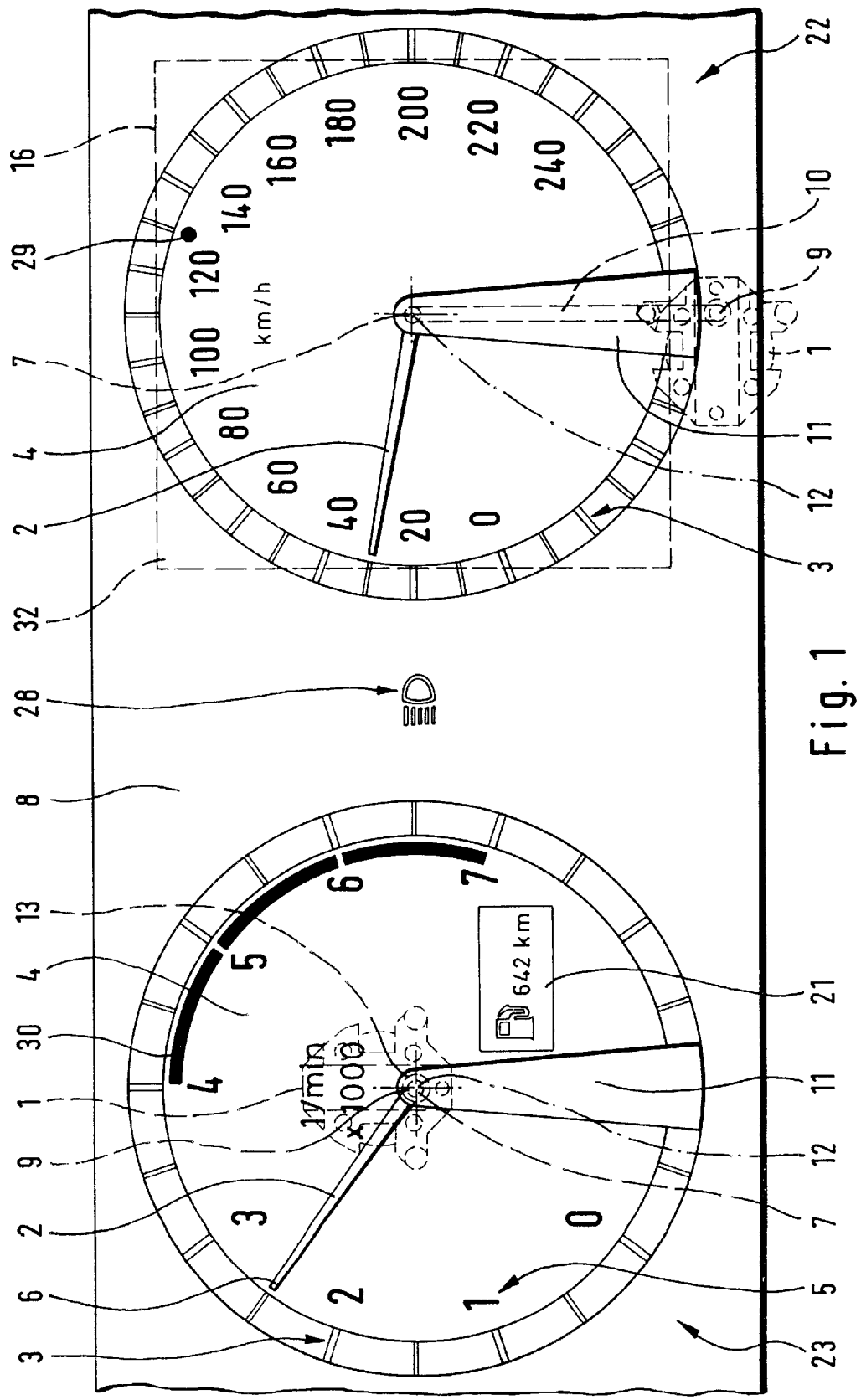
FIG. 1 shows a display device according to the invention.

A display device (illustrated in FIG. 1) of a motor vehicle has two display units 22, 23, each with a pointer 2, which can be actuated by a measuring mechanism 1, for the analog representation of measured values. Corresponding components are provided, as also in the following figures, with identical reference symbols. The display units 22, 23 are arranged in a dial 8, which is also provided with symbol fields 28 which can be illuminated. In each case one scale mark 3 of the display units 22, 23 can, as shown here, be printed onto the dial 8 or be a component of an additional frame element. The scale marks 3 are fixed and nonvariable. In each case one display 4 is arranged in a recess of the dial 8 and in a region which is surrounded by the scale marks 3 in a ring shape. A type of scale labeling 5, inter alia, can be represented on the display 4. The respective scale labeling shows that, in FIG. 1, the left-hand display unit 23 is a rev (revolutions) counter display and the right-hand display unit 22 is a vehicle speed display. The scale labeling 5 can be varied so that, for example, the display region varies, the displayed unit changes over or additional marks, such as for example speed limit marks 29 or rev counter warning marks 30 can be actuated. This also makes it possible to use the display device for displaying a vehicle speed in km/h or in miles/h, for example, without mechanical changes or without printing the dial of a display device differently. Moreover, further displays, such as a fuel tank/remaining distance display 21, are provided on the display 4 in specific fields.

Both the scale labeling 5 and a tip 6 of the pointer 2 are directly assigned to marks on the scale 3 so that it is ensured that the analog pointer instruments of the display units 22, 23 are easily legible.

In the display unit 23, the measuring mechanism 1 of the pointer instrument is arranged directly opposite a pointer shaft 7 so that the pointer shaft 7 and a measuring mechanism output shaft 9 can be connected to one another so as to form a single component. For this purpose, the display 4, which is an LC dot matrix display in the present exemplary embodiment, is provided with a recess, for example a through-hole, so that the measuring mechanism output shaft 9 engages through it. It is also conceivable to couple the measuring mechanism output shaft 9 and the pointer shaft 7 not by positive locking but rather magnetically so that a recess is not required in the display 4. The pointer 2 is connected to the pointer shaft 7, and also to the measuring mechanism output shaft 9, via a pointer hub 13 so that movement of the measuring mechanism output shaft 9 leads to pivoting of the pointer 2 about a pointer pivot axis 12.

The analog pointer instrument of the display unit 22 has a measuring mechanism 1 which is at a distance from the pointer pivot axis 12. The measuring mechanism output shaft 9 drives the pointer shaft 7 of the pointer 2 via a flexible drive mechanism 10. On the viewer side, the gear mechanism 10 is covered by a panel 11. The panel 11 serves at the same time as a cover or guard for the pointer 2 when the latter is in a position of rest. For this -reason, the panel 11 is also provided in the display unit 23. The measuring mechanisms 1 of the display units 22 and 23 are arranged on the side of the dial 8 which is turned away from a viewer and in FIG. 1 only the installation position is represented for the sake of clarification.

Furthermore, a boundary 16 of the display 4 is shown by broken lines on the display unit 22. It is apparent that the display 4 is rectangular and the corner regions 32 of the display 4 which are arranged underneath the scale marks 3 and the dial 8 are not visible to a viewer. These corner regions 32 are not available for a representation of information and therefore do not need to have any elements which can be actuated.

Figure 2:
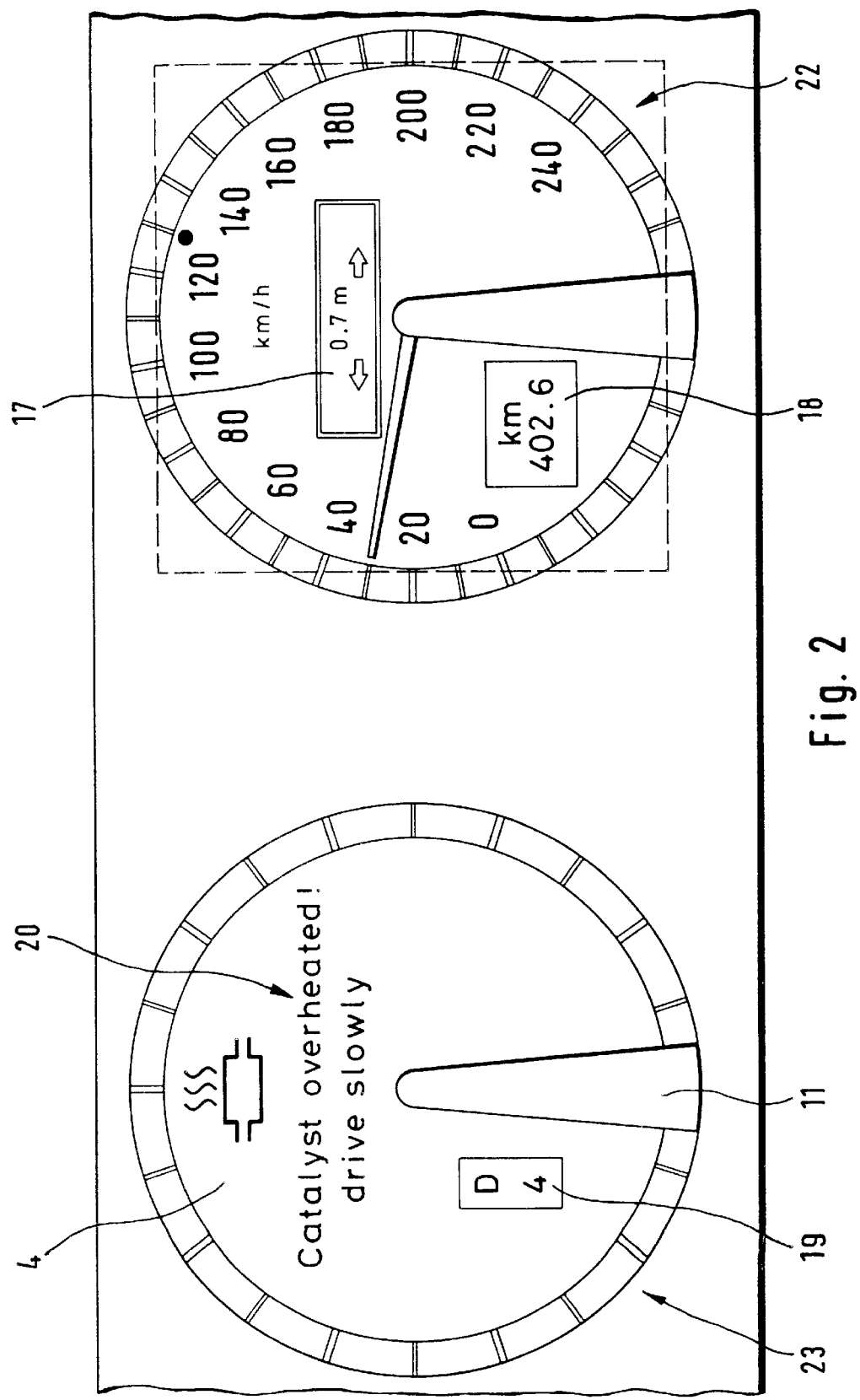
FIG. 2 shows the display device according to FIG. in another actuation state.

FIG. 2 shows the display device from FIG. 1 in a different actuation state of the display unit 23. Here, the pointer of the display unit 23 is in a position of rest behind the panel 11. Thus, the entire display 4 is available for representing operating information of the motor vehicle. A display panel 19 for representing a gear speed display of an automatic transmission is constantly kept free. In contrast, the rest of the display 4 is no longer used—as in FIG. 1—for a rev counter and instead serves to represent a warning display 20 for an overheated catalytic converter in the motor vehicle's exhaust system. In order to increase the attentiveness of the viewer, the warning display 20 may be represented, for example, in a flashing color or in a color which differs from the color of the rev counter, in FIG. 1, and gives a powerful signal. Additional display fields 17 for a display of the distance from the next vehicle and 18 for the display of the distance traveled are provided in the travel speed display of the display unit 22.

Figure 3:
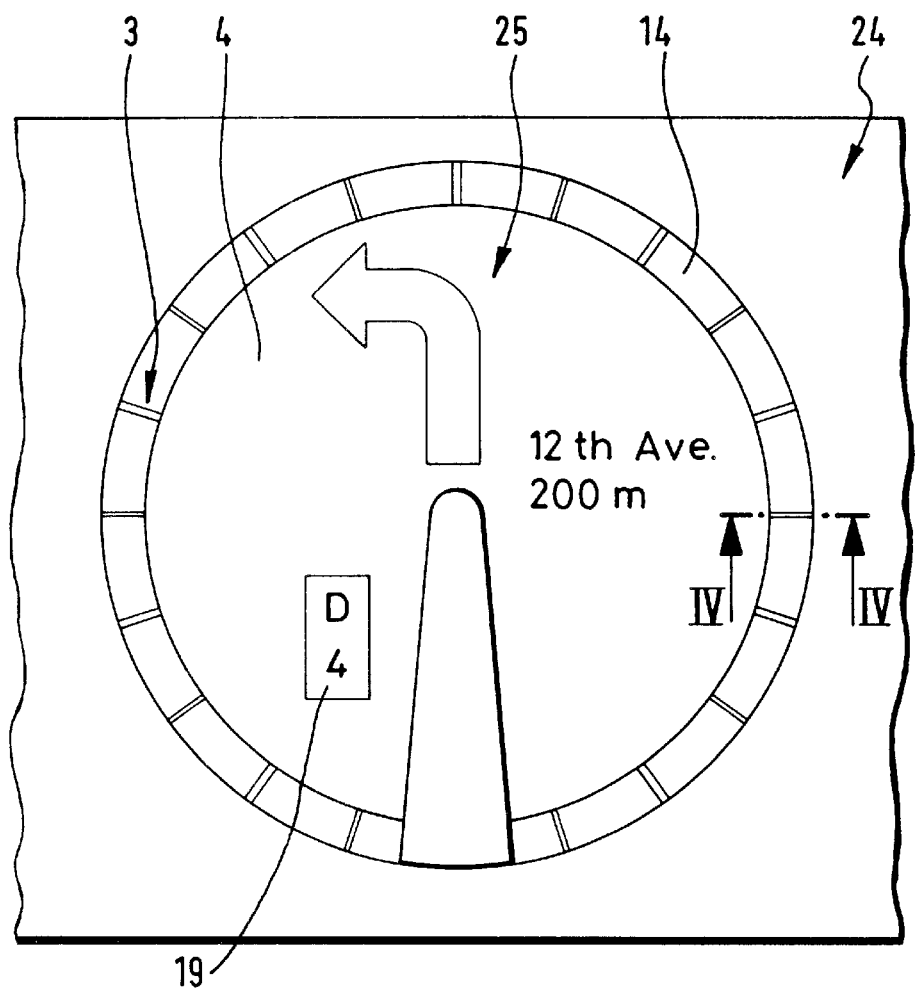
FIG. 3 shows a further display device according to the invention.

A further exemplary embodiment of a display device is shown in FIG. 3. Here, a display 4 of a display unit 24 is inserted into a frame element 14 which has scale marks 3. The display 4 has a display field 19 for a gear speed display of an automatic transmission and represents a traffic guidance display 25 in the rest of the display region. In the display unit 24, a pointer of an analog display instrument is also covered by a panel 11 in a parking position. However, it is also conceivable that the display unit 24 does not have a pointer instrument but rather merely a display 4 with a frame element 14. Such an embodiment is appropriate, for example, if the intention is to create a uniform appearance of display units with a pointer instrument—as illustrated for example in FIGS. 1 and 2—and without a pointer instrument in a dashboard of a motor vehicle.

Figure 4:
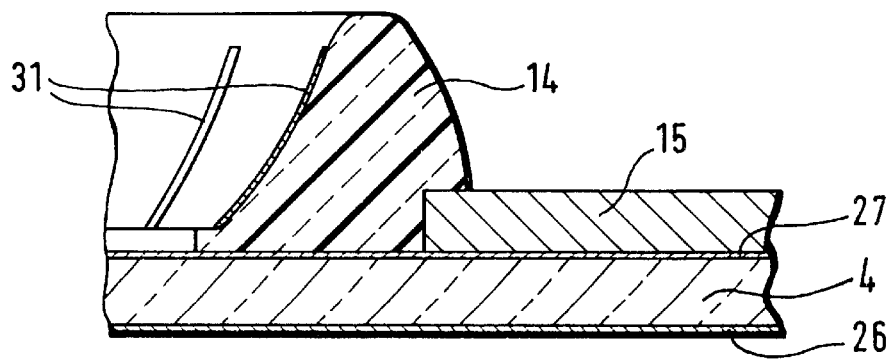
FIG. 4 shows a section along the line IV—IV of the display device according to FIG. 3.

In order to clarify the three-dimensional structure of the display unit 24, a section along the line IV—IV from FIG. 3 is shown in FIG. 4. The frame element 14 is fitted onto the display 4 and clicked or bonded to it. The display 4, in this case a liquid crystal cell, is provided at its front and at its rear sides with in each case an electro-luminescent film 27 or 26 for illuminating the display 4. The frame element 14 which bounds the display region to be actuated is designed as a light guide and can be illuminated by a light source (not illustrated) which feeds light into the light guide. Scale divisions 31 of the scale 3 on the frame element 14 can, for example, be printed onto the frame element or engraved in it. The display region arranged outside the frame element 14 is covered for a viewer by a panel 15 which may, for example, be connected to a dial or a symbol field film of a combination instrument of the motor vehicle so as to form a single component.

I claim:

1. A display device, in particular for a vehicle, comprising a movable pointer, a measuring mechanism, fixed scale marks, and a variable display;

wherein the pointer is actuatable by the measuring mechanism for pivotal movement over a pointer region to provide an analog representation of measured values, and the fixed scale marks are coordinated to positions of the pointer to present the measured values;

the display is arranged in the pointer region over at least part of which the pointer travels, the display presenting variable information and providing a labeling of the scale marks; and at least part of the display extends along the scale marks, and a portion of the display is actuatable for replacing the scale labeling with the variable information; and the scale marks are arranged outside said portion of the display which is actuatable.

2. The display device as claimed in claim 1, wherein the scale labeling is variable.

3. The display device as claimed in claim 1, wherein the display is a dot matrix display.

4. The display device according to claim 1, wherein display has a liquid crystal cell.

5. The display device as claimed in claim 1, wherein the pointer is pivoted about an axis which is approximately perpendicular to a representational plane of the display.

6. The display device as claimed in claim 5, wherein the pointer has a pointer hub which is connected to a shaft of the pointer, and wherein axes of rotation of the pointer shaft and of an output shaft of the measuring mechanism are arranged so as to be congruent or approximately parallel to one another.

7. The display device as claimed in claim 6, wherein the pointer shaft and the measuring mechanism output shaft are connected to one another so as to form a single component.

8. The display device as claimed in claim 6, further comprising a gear mechanism which transmits a rotary movement of the measuring mechanism output shaft to the pointer shaft, wherein the gear mechanism is arranged between the measuring mechanism output shaft and the pointer shaft.

9. The display device as claimed in claim 8, wherein the gear mechanism is a flexible drive mechanism, a friction wheel mechanism or a gearwheel mechanism.

10. The display device as claimed in claim 8, wherein at least part of the gear mechanism is located in front of a surface of the display, said surface faces a viewer.

11. The display device as claimed in claim 10, wherein the part of the gear mechanism which is located in front of the display surface is covered with a panel.

12. The display device as claimed in claim 1, further comprising a panel which covers the pointer.

13. The display device as claimed in claim 1, wherein the scale marks are arranged in the direct vicinity of or within, a region of the display device over which a tip of the pointer travels.

14. The display device as claimed in claim 1, wherein the scale marks are located on the display.

15. The display device as claimed in claim 1, further comprising a frame element engaging at least partially around the display, wherein the scale marks are located on the frame element.

16. The display device as claimed in claim 15, wherein the display is inserted into a recess in the frame element.

17. The display device as claimed in claim 15, wherein the frame element is fitted onto the display.

18. The display device as claimed in claim 15, wherein the frame element is a light guide.

19. The display device as claimed in claim 1, wherein the scale marks are elevated or countersunk with respect to a representational plane of the display.

20. The display device as claimed in claim 1, wherein the scale marks are illuminatable.

21. The display device as claimed in claim 1, further comprising a panel covering part of the display.

22. The display device as claimed in claim 1, wherein the display is actuatable in at least one part, for replacing said scale labeling with a warning message.

23. The display device as claimed in claim 1, wherein a portion of the display is unactuatable.

24. The display device as claimed in claim 1, wherein the display is illuminatable.

25. The display device as claimed in claim 1, wherein the display device has a dial, the scale marks being represented on the dial, and at least one actuatable region of the display being arranged in a recess of the dial.

* * * * *